US008560838B2

(12) United States Patent  (10) Patent No.: US 8,560,838 B2
Eguchi et al.  (45) Date of Patent: Oct. 15, 2013

(54) DOCUMENT DISPOSAL CERTIFICATION APPARATUS, DOCUMENT DISPOSAL CERTIFICATION METHOD, COMPUTER READABLE MEDIUM STORING DOCUMENT DISPOSAL CERTIFICATION PROGRAM AND COMPUTER DATA SIGNAL

(75) Inventors: Hiroyuki Eguchi, Kanagawa (JP); Ryu Inada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1598 days.

(21) Appl. No.: 11/878,450

(22) Filed: Jul. 24, 2007

(65) Prior Publication Data

US 2008/0109901 A1     May 8, 2008

(30) Foreign Application Priority Data

Nov. 7, 2006  (JP) .................................. 2006-301150

(51) Int. Cl.
 *G06F 21/00*  (2013.01)
(52) U.S. Cl.
 USPC .......................................... 713/156; 713/178
(58) Field of Classification Search
 USPC .......................................................... 713/156
 See application file for complete search history.

(56) References Cited

U.S. PATENT DOCUMENTS

| 2004/0053537 | A1 | 3/2004 | Itou |
| 2007/0019244 | A1* | 1/2007 | Rekiere ......................... 358/3.28 |
| 2007/0075168 | A1* | 4/2007 | Rodriguez et al. .............. 241/36 |
| 2008/0065263 | A1 | 3/2008 | Sugawara et al. |
| 2008/0088873 | A1 | 4/2008 | Chihara |

FOREIGN PATENT DOCUMENTS

| JP | A-11-15899 | 1/1999 |
| JP | A-2001-325038 | 11/2001 |
| JP | A-2003-5639 | 1/2003 |
| JP | A-2003-58629 | 2/2003 |
| JP | A-2003-196429 | 7/2003 |
| JP | B2-3484030 | 10/2003 |
| JP | A-2004-103347 | 4/2004 |
| JP | A-2004-227462 | 8/2004 |
| JP | A-2005-135211 | 5/2005 |
| JP | A 2005-190365 | 7/2005 |
| JP | A-2006-99348 | 4/2006 |
| JP | A-2006-186585 | 7/2006 |
| JP | A-2006-309282 | 11/2006 |

(Continued)

OTHER PUBLICATIONS

Japanese Office Action issued in Japanese Patent Application No. 2006-301150 on Jan. 17, 2011 (with translation).

*Primary Examiner* — Gilberto Barron, Jr.
*Assistant Examiner* — Izunna Okeke
(74) *Attorney, Agent, or Firm* — Oliff & Berridge, PLC (57) ABSTRACT

A document disposal certification apparatus is installed in a document generation apparatus for generating a document, a document disposal apparatus for disposing of the document, or a server that are used with being connected to the document generation apparatus and the document disposal apparatus. The document disposal certification apparatus includes a generation information acquisition section, a disposal information acquisition section and an information management section. The generation information acquisition section acquires information concerning document generation in the document generation apparatus, as document presence certification information. The disposal information acquisition section acquires information concerning document disposal in the document disposal apparatus, as document disposal certification information. The information management section stores and manages the document presence certification information and the document disposal certification information in association with each other for the same document. Each of the document presence certification information and the document disposal certification information contains digital certification information.

5 Claims, 7 Drawing Sheets

(56) References Cited

FOREIGN PATENT DOCUMENTS

| JP | A-2006-344083 | 12/2006 |
| JP | A-2008-43839 | 2/2008 |
| JP | B2-4089742 | 3/2008 |
| JP | A-2008-117246 | 5/2008 |

\* cited by examiner

DOCUMENT STATUS MANAGEMENT TABLE

| DOCUMENT ID | STATUS |
|---|---|
| doc0324f1 | COPY |
| doc0324f2 | PRINT |
| doc0324f3 | ALREADY DISPOSED OF |

FIG. 3B

GENERATION CERTIFICATION INFORMATION MANAGEMENT TABLE

| DOCUMENT ID | TIMEID | USER ID | MACHINE |
|---|---|---|---|
| doc0324f1 | 30DA | ICD2 | 3D30 |
| doc0324f2 | 30FA | ICD2 | 3D30 |
| doc0324f3 | 30FB | 03FB | 23BB |

FIG. 3C

DISPOSAL CERTIFICATION INFORMATION MANAGEMENT TABLE

| DOCUMENT ID | TIMEID | USER ID | MACHINE |
|---|---|---|---|
| doc0324f1 | 30DA | ICD2 | 3D30 |
| doc0324f2 | 30FA | ICD2 | 3D30 |
| doc0324f3 | 31DC | 04D0 | 50F0 |

FIG. 3D

DISPOSAL CONDITION MANAGEMENT TABLE

| DOCUMENT ID | PERMISSION FOR DISPOSAL | EXPIRATION DATE |
|---|---|---|
| doc0324f1 | ○ | 060114 |
| doc0324f2 | × | 060425 |
| doc0324f3 | ○ | 060320 |

DOCUMENT DISPOSAL CERTIFICATION APPARATUS, DOCUMENT DISPOSAL CERTIFICATION METHOD, COMPUTER READABLE MEDIUM STORING DOCUMENT DISPOSAL CERTIFICATION PROGRAM AND COMPUTER DATA SIGNAL

CROSS-REFERENCE TO RELATED APPLICATIONS

This application is based on and claims priority under 35 U.S.C. §119 from Japanese Patent Application No. 2006-301150 filed on Nov. 7, 2006.

BACKGROUND

1. Technical Field

The invention relates to a document disposal certification apparatus, a document disposal certification method, a computer readable medium storing a document disposal certification program and a computer data signal embedded with the document disposal certification program for certifying presence of a paper document (may be simply referred to as "document") and its disposal.

2. Related Art

Nowadays, enterprises are required to conduct internal control of documents to conform to Japanese SOX Law (financial instrument transaction law), etc., and importance is placed on management of the document life cycle from generation to disposal as well as simple generation and disposal of documents.

SUMMARY

According to an aspect of the invention, a document disposal certification apparatus is installed in any of a document generation apparatus for generating a document, a document disposal apparatus for disposing of the document, or a server that are used with being connected to the document generation apparatus and the document disposal apparatus. The document disposal certification apparatus includes a generation information acquisition section, a disposal information acquisition section and an information management section. The generation information acquisition section acquires information concerning document generation in the document generation apparatus, as document presence certification information. The disposal information acquisition section acquires information concerning document disposal in the document disposal apparatus, as document disposal certification information. The information management section stores and manages the document presence certification information and the document disposal certification information in association with each other for the same document. Each of the document presence certification information and the document disposal certification information contains digital certification information.

BRIEF DESCRIPTION OF THE DRAWINGS

Exemplary embodiments of the invention will be described in detailed below with reference to the accompanying drawings, wherein:

FIG. 5 is a flowchart to show a processing operation example in the document disposal certification apparatus according to the exemplary embodiment of the invention when a document is disposed of;

DETAILED DESCRIPTION

A document disposal certification apparatus, a document disposal certification method, a computer readable medium storing a document disposal certification program and a computer data signal embedded with the document disposal certification program according to exemplary embodiments of the invention will be described below.

First, before description of the document disposal certification apparatus, the document disposal certification method, the computer readable medium storing the document disposal certification program and the computer data signal embedded with the document disposal certification program according to the exemplary embodiment of the invention, described will be the entire document disposal certification system including the document disposal certification apparatus, the document disposal certification method, the computer readable medium storing the document disposal certification program and the computer data signal embedded with the document disposal certification program.

FIG. 1 is a schematic representation to show one configuration example of the document disposal certification system. The document disposal certification system illustrated in the figure includes a document generation apparatus 1, a document disposal apparatus 2, and a communication line 3 for connecting the apparatuses 1, 2.

The document generation apparatus 1 is implemented as a copier, a printer, a multifunction processing machine integrating their functions, etc., for printing out document data to generate a document. It is assumed that the document generation apparatus 1 has a function of giving a unique document ID in the system to the generated document and a function of a computer including a CPU (Central Processing Unit), RAM (Random Access Memory), ROM (Read-Only Memory), etc., as well as the document generation function.

On the other hand, the document disposal apparatus 2 is implemented as a shredder, for example, for disposing of a document by shredding the document until the document becomes an irreproducible state. It is assumed that the document disposal apparatus 2 has a function of reading an image from the document to be disposed of and a function of a computer including a CPU, RAM, ROM, etc., as well as the document disposal function.

Each of the document generation apparatus 1 and the document disposal apparatus 2 previously retains a digital certificate issued by a reliable certificate authority to certify identification of the apparatuses 1, 2. The specifications of the digital certificate, for example, may be one defined in ITU (International Telecommunication Union)-T X.509.

Each of the document generation apparatus 1 and the document disposal apparatus 2 has a function of authenticating identification of a user of the apparatus. To authenticate identification of a user, an IC card, a USB key, etc., owned by the user may be used.

It is assumed that each of the document generation apparatus 1 and the document disposal apparatus 2 further has a function of acquiring time information via the communication line 3 from an external time stamp server. The time stamp server is a known server and therefore will not be described here. Each of the document generation apparatus 1 and the document disposal apparatus 2 may include a clock to deal with the case where time information cannot be acquired from the time stamp server.

The communication line 3 for connecting the document generation apparatus 1 and the document disposal apparatus 2 may be wire or wireless and may be a communication line to construct a wide-area network using a public switched network, etc., or a communication line to construct a local area network if it enables information transfer between the document generation apparatus 1 and the document disposal apparatus 2. However, it is desirable that SSL (Secure Socket Layer) encryption is adopted on the communication line 3 to prevent leakage of communicated information.

Figure 2:
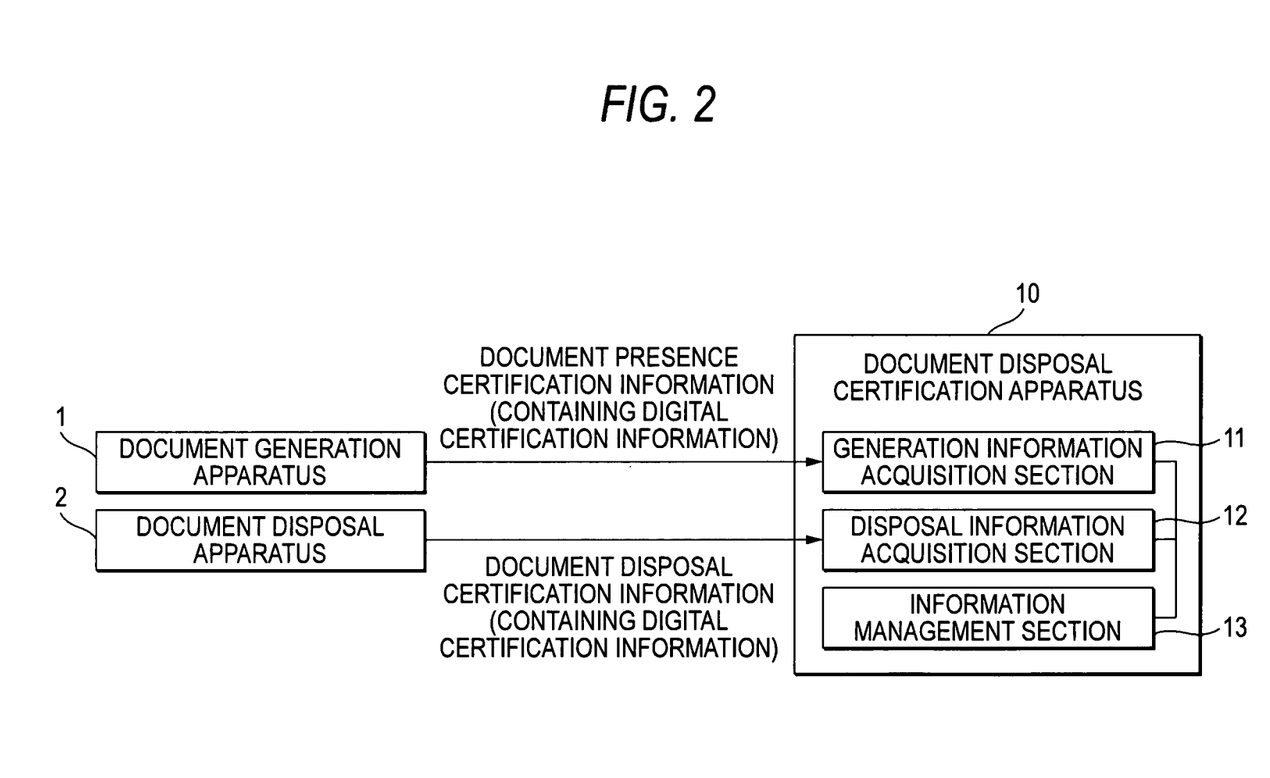
FIG. 2 is a block diagram to show a functional configuration example of the document disposal certification apparatus according to an exemplary embodiment of the invention.
Figure 3A:
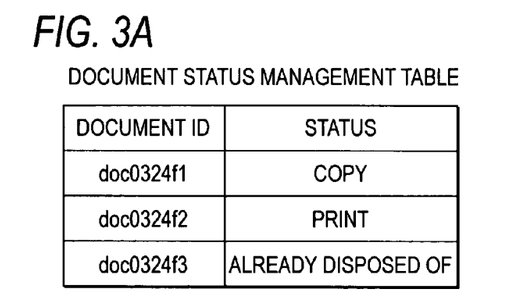
FIG. 3 is a schematic representation to show specific examples of information management tables.
Figure 3B:
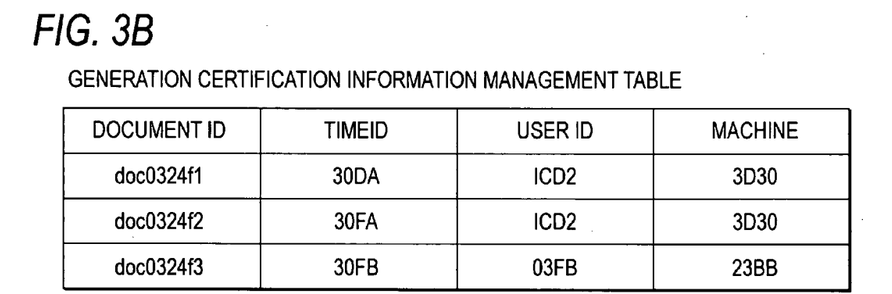
Figure 3C:
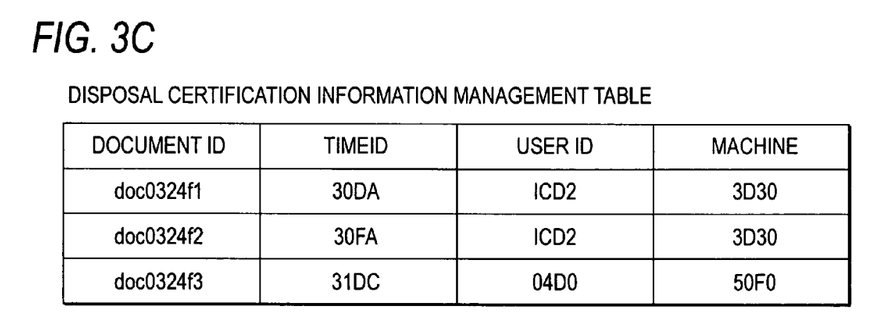
Figure 3D:
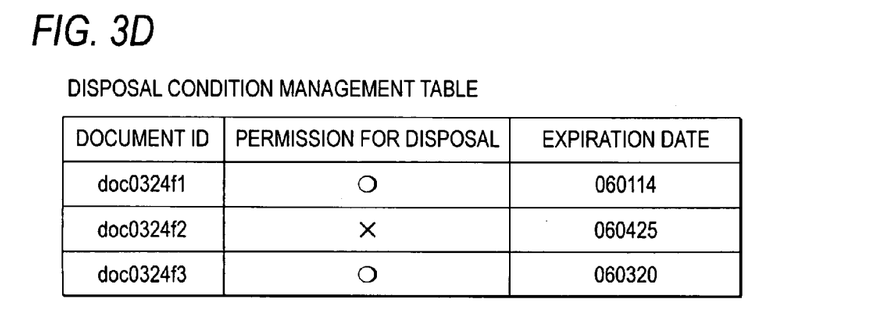

Next, the document disposal certification apparatus used in the described system configuration will be described. FIG. 2 is a block diagram to show a functional configuration example of the document disposal certification apparatus according to the exemplary embodiment of the invention. As illustrated in the figure, a document disposal certification apparatus 10 has functions of a generation information acquisition section 11, a disposal information acquisition section 12, and an information management section 13.

The generation information acquisition section 11 acquires information concerning document generation in the document generation apparatus 1. Hereinafter, the information concerning document generation acquired by the generation information acquisition section 11 from the document generation apparatus 1 will be referred to as "document presence certification information." It is assumed that the document presence certification information contains digital certification information. The digital certification information refers to information certifying that a target object is true. Specifically, information concerning the digital certificate retained by the document generation apparatus 1, user's authentication information by the document generation apparatus 1, and the time stamp information (or clock information) acquired by the document generation apparatus 1 correspond to the digital certification information.

The disposal information acquisition section 12 acquires information concerning document disposal in the document disposal apparatus 2. Hereinafter, the information concerning document disposal acquired by the disposal information acquisition section 12 from the document disposal apparatus 2 will be referred to as "document disposal certification information." It is assumed that like the document presence certification information, the document disposal certification information also contains digital certification information.

The information management section 13 manages and stores the document presence certification information and the document disposal certification information for the same document in association with each other. To associate them with each other, the document ID given at the document generation time may be used. The managing and storing may be executed in a table format as described later.

FIG. 3 is a schematic representation to show specific examples of information management tables. Shown here are a document status management table for managing a document state (status) (see FIG. 3A), a generation certification information management table for managing the document presence certification information (see FIG. 3B), a disposal certification information management table for managing the document disposal certification information (see FIG. 3C), and a disposal condition management table for managing a document disposal condition (see FIG. 3D).

The sections 11 to 13 constituting the document disposal certification apparatus 10 as described above are implemented as the computer function in the document generation apparatus 1 or the document disposal apparatus 2 executes a predetermined program. In this case, the predetermined program may be stored on a computer-readable storage medium and be provided or may be distributed through wired or wireless communication means before the program is installed in the document generation apparatus 1 or the document disposal apparatus 2. That is, the document disposal certification apparatus 10 having the functional configuration described above may also be implemented as a document shredding program that can be installed in the document generation apparatus 1 or the document disposal apparatus 2.

It is not necessary that the sections 11 to are placed in either the document generation apparatus 1 or the document disposal apparatus 2 and may be distributed between the document generation apparatus 1 and the document disposal apparatus 2. That is, the document disposal certification apparatus 10 having the configuration described above is installed in either the document generation apparatus 1 or the document disposal apparatus 2 or is distributed between the document generation apparatus 1 and the document disposal apparatus 2 for use.

Figure 1A:
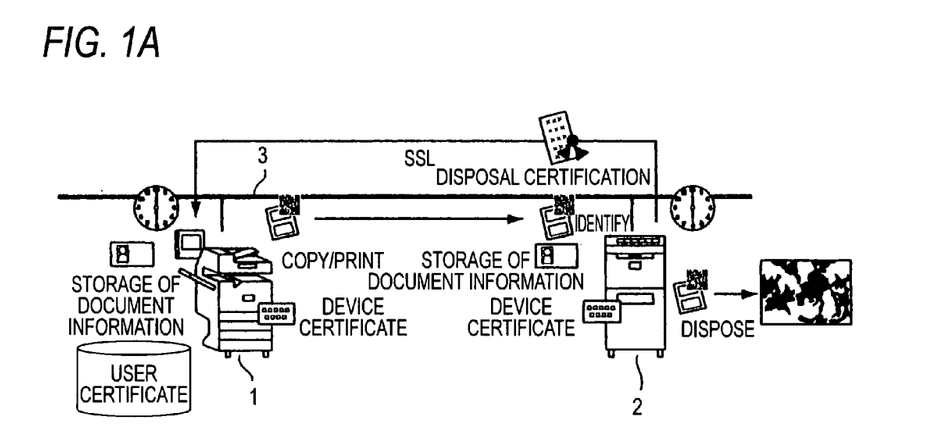
FIG. 1 is a schematic representation to show one configuration example of a document disposal certification system.

Next, processing operation examples in the document disposal certification apparatus 10 having the configuration described above will be described. Here, the case where the document disposal certification apparatus 10 is placed in the document generation apparatus 1 as shown in FIG. 1A is taken as an example.

Figure 4:
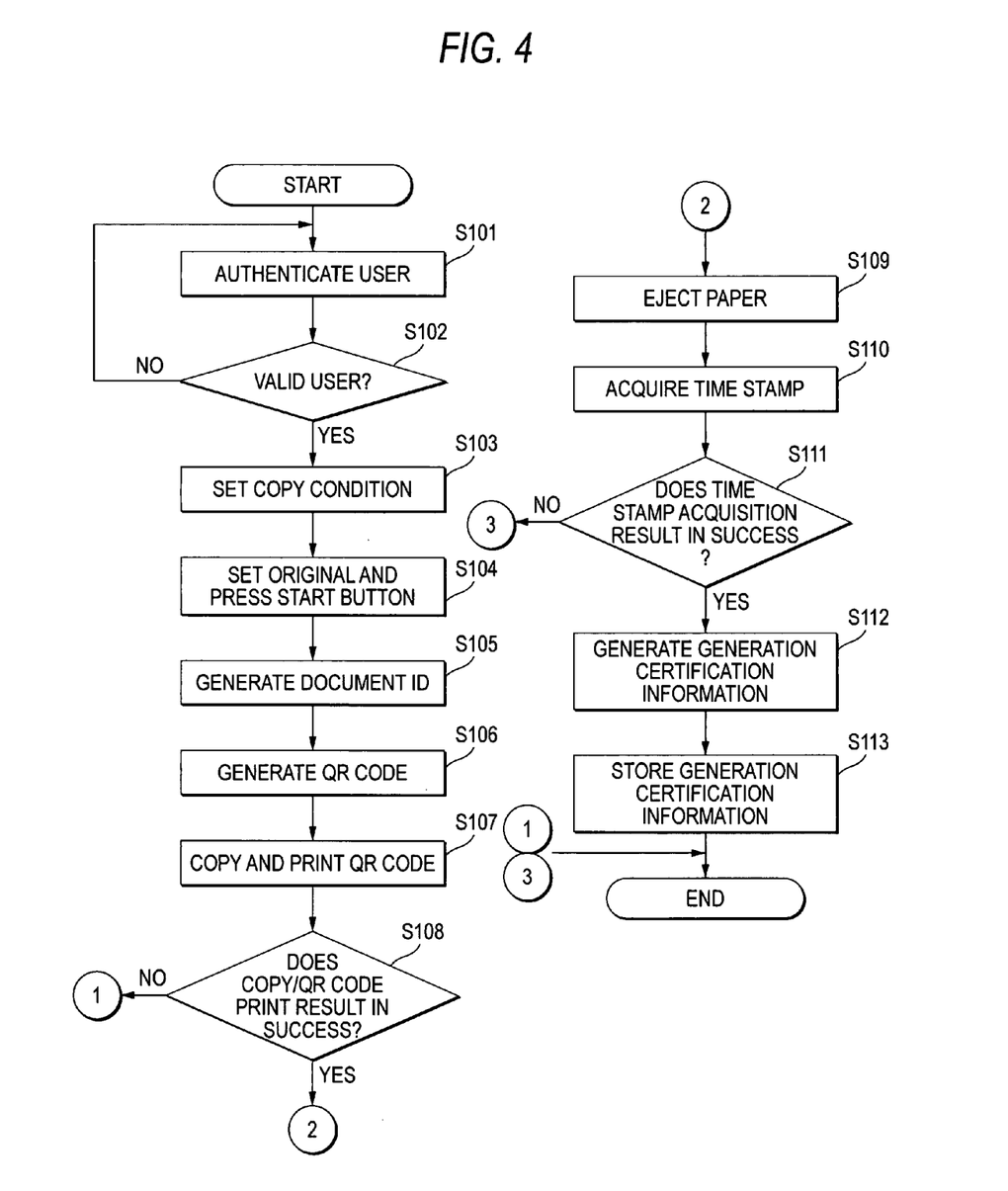
FIG. 4 is a flowchart to show a processing operation example in the document disposal certification apparatus according to the exemplary embodiment of the invention when a document is generated.

First, a processing operation example when a document is generated in the document generation apparatus 1 will be described. FIG. 4 is a flowchart to show a processing operation example in the document disposal certification apparatus 10 according to the exemplary embodiment of the invention when a document is generated. As illustrated in the figure, when a document is generated, the document generation apparatus 1 authenticates a user using an IC card or a USB key in which the user's digital certificate is stored by the user (step 101 (S101)). Here, the user authentication information may be managed locally or user information may be inquired of an LDAP (Lightweight Directory Access Protocol) server for authentication.

If the user is valid (S102) as a result of the user authentication, copy conditions such as scale up/down, edit, color/monochrome and stapler available/unavailable are set in the document generation apparatus 1 (S103). When the user sets an original to be copied and presses a start button (S104), the original is copied and a document ID of a document generated by outputting the copied image is generated (S105). To generate the document ID, a known technique may be used. When the document ID is generated, it is converted into a two-dimensional code such as a QR Code® for embedding the document ID in the document (S106). The document containing the two-dimensional code is printed out (S107). The document ID may be printed out using any other information (for example, text information) rather than the two-dimensional code or may be added using an IC tag such as RFID (Radio Frequency Identification).

If the printout is performed normally, the document generation apparatus 1 ejects the printout paper, that is, the generated document to the outside of the apparatus (S108) and acquires, from the time stamp server, time stamp information as time certification of the termination time of the printout processing (S109). When acquisition of the time stamp information results in success, the document generation apparatus 1 generates document presence certification information, which is information confirming that the printout document reliably exists, based on digital certificate of the document generation apparatus 1 retained by the document generation apparatus 1, the user authentication information obtained through user authentication at the processing start time, and the time stamp information at the printout termination time (S110). The document generation apparatus 1 stores the document presence certification information in the generation certification information management table and manages the document presence certification information (S111).

If management of the document presence certification information is thus conducted, it is made possible to determine "when" and "where" "who" generated the document by the document generation apparatus 1. Moreover, the document presence certification information is generated based on the user authentication information by the document generation apparatus 1, the information concerning the digital certificate retained by the document generation apparatus 1, and the time stamp information acquired by the document generation apparatus 1 and more specifically contains the document present certification information contains the digital certification information of the user ID certified by the user's digital certificate, the machine ID certified by the digital certificate of the document generation apparatus 1, the time stamp information certified by the time stamp server. Therefore, the document presentation certificate information is highly reliable. The document presence certification information is signed using a private key of the user's digital certificate, the digital certificate of the document generation apparatus 1, etc., or is encrypted with a public key. Thereby, tampering and information leakage can also be prevented.

In the processing operation example, the process for the document generation apparatus 1 to copy an original to generate a document has been described. For example, it is considered that similar processing is also performed for printing out image data in response to a print command from a client. However, to print out in response to a print command, time stamp information may be acquired by a printer driver of the client and may be transmitted to the document generation apparatus 1. The communication channel between the client and the document generation apparatus 1 may be encrypted with SSL to prevent information leakage, needless to say.

Figure 5:
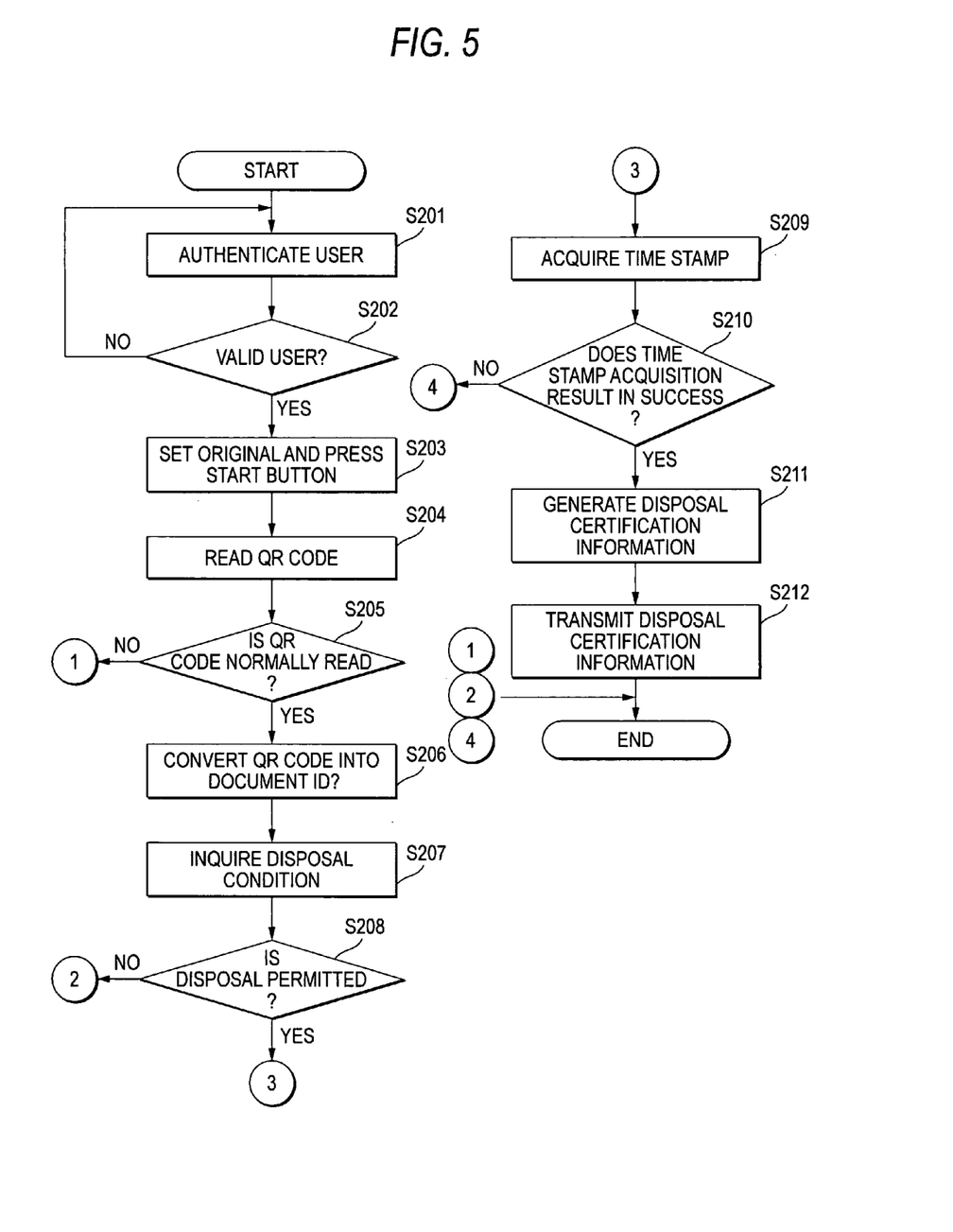

Next, a processing operation example when a document is disposed of in the document disposal apparatus 2 will be described. FIG. 5 is a flowchart to show a processing operation example in the document disposal certification apparatus 10 according to the exemplary embodiment of the invention when a document is disposed of. As illustrated in the figure, when a document is disposed of, the document disposal apparatus 2 authenticates a user using an IC card or a USB key in which the user's digital certificate is stored by the user (S201). Here, the user authentication information may be managed locally or user information may be inquired of the LDAP server for authentication.

If the user is valid (S202) as a result of the user authentication, when the user sets a document to be disposed of and presses a start button (S203), the document disposal apparatus 2 reads an image from the document and reads the two-dimensional code added to the document (S204). As a result, if the two-dimensional code is read correctly, the document disposal apparatus 2 converts it into a document ID of the document to be disposed of based on the read result (S205). When thus acquiring the document ID of the document to be disposed of, the document disposal apparatus 2 inquires the disposal condition of the document, that is, inquires as to whether or not the document can be disposed of using the document ID as a key (S206). An answer to the inquiry as to whether or not the document can be disposed of is made based on contents of the disposal condition management table.

As a result, if the answer indicates that it is not permitted to dispose of the document or no answer is gotten for some reason (for example, communication error), the document is not disposed of. If the answer indicates that it is permitted to dispose of the document (S207), the document disposal apparatus 2 shreds the setup document to be disposed of to dispose of the document (S208) and acquires, from the time stamp server, time stamp information as time certification of the termination time of the document disposal processing (S209). If acquisition of the time stamp information results in success, the document disposal apparatus 2 generates document disposal certification information, which is information confirming that the printout document is reliably disposed of, based on digital certificate of the document disposal apparatus 2 retained by the document disposal apparatus 2, user authentication information obtained through user authentication at the processing start time, and the time stamp information at the document disposal termination time (S210). The document disposal apparatus 2 transmits the document disposal certification information to the document generation apparatus 1 and causes the document generation apparatus 1 to store and manage the document disposal certification information using the disposal certification information management table (S211).

If management of the document disposal certification information is thus conducted, it is made possible to determine "when" and "where" "who" disposed of the document by the document disposal apparatus 2. Moreover, the document disposal certification information is generated based on the user authentication information by the document disposal apparatus 2, the information concerning the digital certificate retained by the document disposal apparatus 2, and the time stamp information acquired by the document disposal apparatus 2 and more specifically contains the digital certification information of the user ID certified by the user's digital certificate, the machine ID certified by the digital certificate of the document disposal apparatus 2, the time stamp information certified by the time stamp server. The document disposal certification information is, therefore, highly reliable. The document disposal certification information is signed using a private key of the user's digital certificate, the digital certificate of the document disposal apparatus 2, etc., or is encrypted with a public key. Thereby, tampering and information leakage can also be prevented.

Since the document generation apparatus 1 manages the document disposal certification information like management of the document presence certification information, it is made possible to manage the document presence certification information and the document disposal certification information in association with each other for the same document identified by the same document ID. Therefore, strict management of the document life cycle from generation to disposal of the document can be conducted. Each of the document presence certification information and the document disposal certification information contains digital certification information. Thus, the confidentiality and integrity of the certification are also ensured.

Figure 1B:
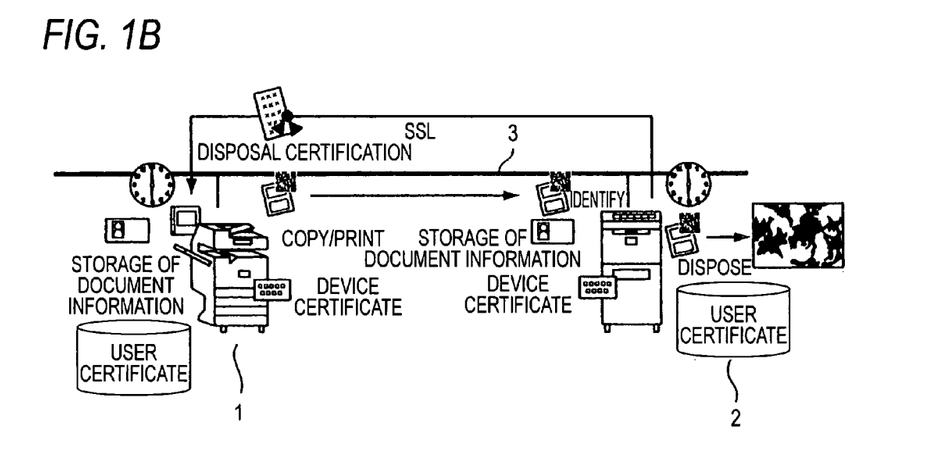

As shown in FIG. 1A, the case where the document disposal certification apparatus 10 is placed in the document generation apparatus 1, that is, the case where the document generation apparatus 1 contains the generation certification information management table and the disposal certification information management table and stores and manages the document presence certification information and the document disposal certification information has been described by way of example. However, as shown in FIG. 1B, the document disposal certification apparatus 10 may be distributed between the document generation apparatus 1 and the document disposal apparatus 2 or may be placed in the document disposal apparatus 2 so that the respective sides store and manage the document presence certification information and the document disposal certification information. In this case, the document generation apparatus 1 transmits the document presence certification information to the document disposal apparatus 2, which then stores and manages the document presence certification information together with the document disposal certification information.

In the document disposal certification system having the configuration described above, it is considered that a disposal certificate certifying disposal of a document is output using the stored and managed document disposal certification information regardless of whether the document disposal certification apparatus 10 is placed in the document generation apparatus 1 or the document disposal apparatus 2. In this case, the apparatus for storing and managing the document disposal certification information may output a disposal certificate corresponding to any desired document ID in response to user's operation. Alternatively, an apparatus which does not store and manage the document disposal certification information may inquire the document disposal certification information of the information retention management apparatus in response to user's operation and may output a disposal certificate corresponding to any desired document ID based on the inquiry result. That is, output of a disposal certificate can be performed flexibly in accordance with the system configuration.

Figure 6:
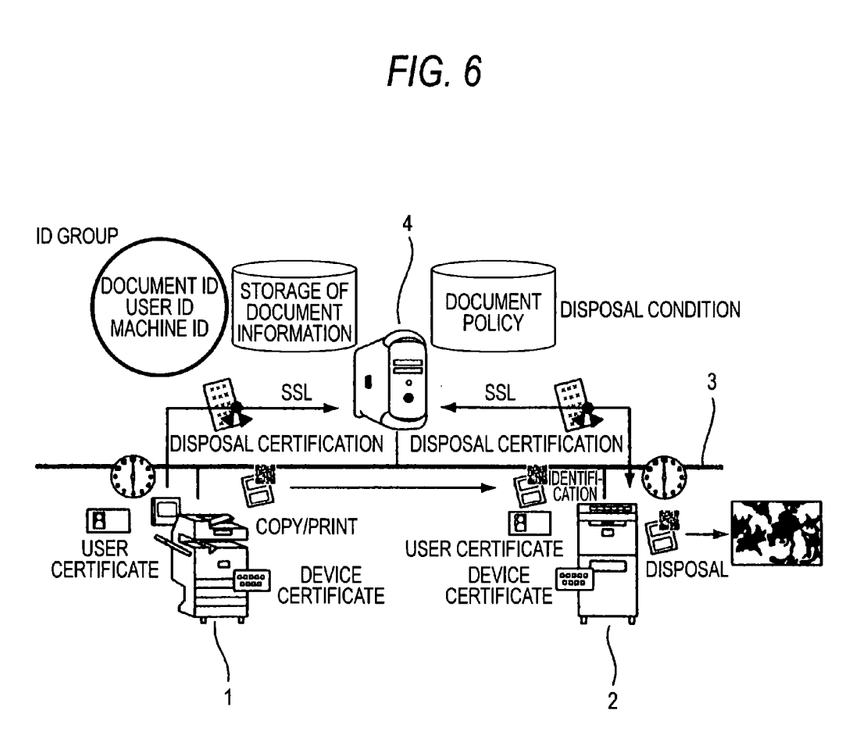
FIG. 6 is a schematic representation to show another configuration example of the document disposal certification system.

Next, another configuration example of the document disposal certification system will be described. FIG. 6 is a schematic representation to show another configuration example of the document disposal certification system. The document disposal certification system illustrated in the figure differs from the document disposal certification system having the configuration described above in that it includes a server 4 connected to the document generation apparatus 1 and the document disposal apparatus 2 in addition to the document generation apparatus 1 and the document disposal apparatus 2. The server 4 is connected to the document generation apparatus 1 and the document disposal apparatus 2 via the communication line 3. It is assumed that communications between the document generation apparatus 1 and the document disposal apparatus 2 are encrypted with SSL.

The server 4 is implemented as a machine having a function of a computer including a CPU, RAM, ROM, etc., that is, as a computer for performing information processing, information storage, etc., and is placed mainly for conducting document management in the system. Therefore, if the server 4 is provided, it functions as the document disposal certification apparatus 10. However, if the server 4 is provided, the document disposal certification apparatus 10 may be installed in either the document generation apparatus 1 or the document disposal apparatus 2 or may be distributed among the document generation apparatus 1, the document disposal apparatus 2, and the server 4.

Figure 7:
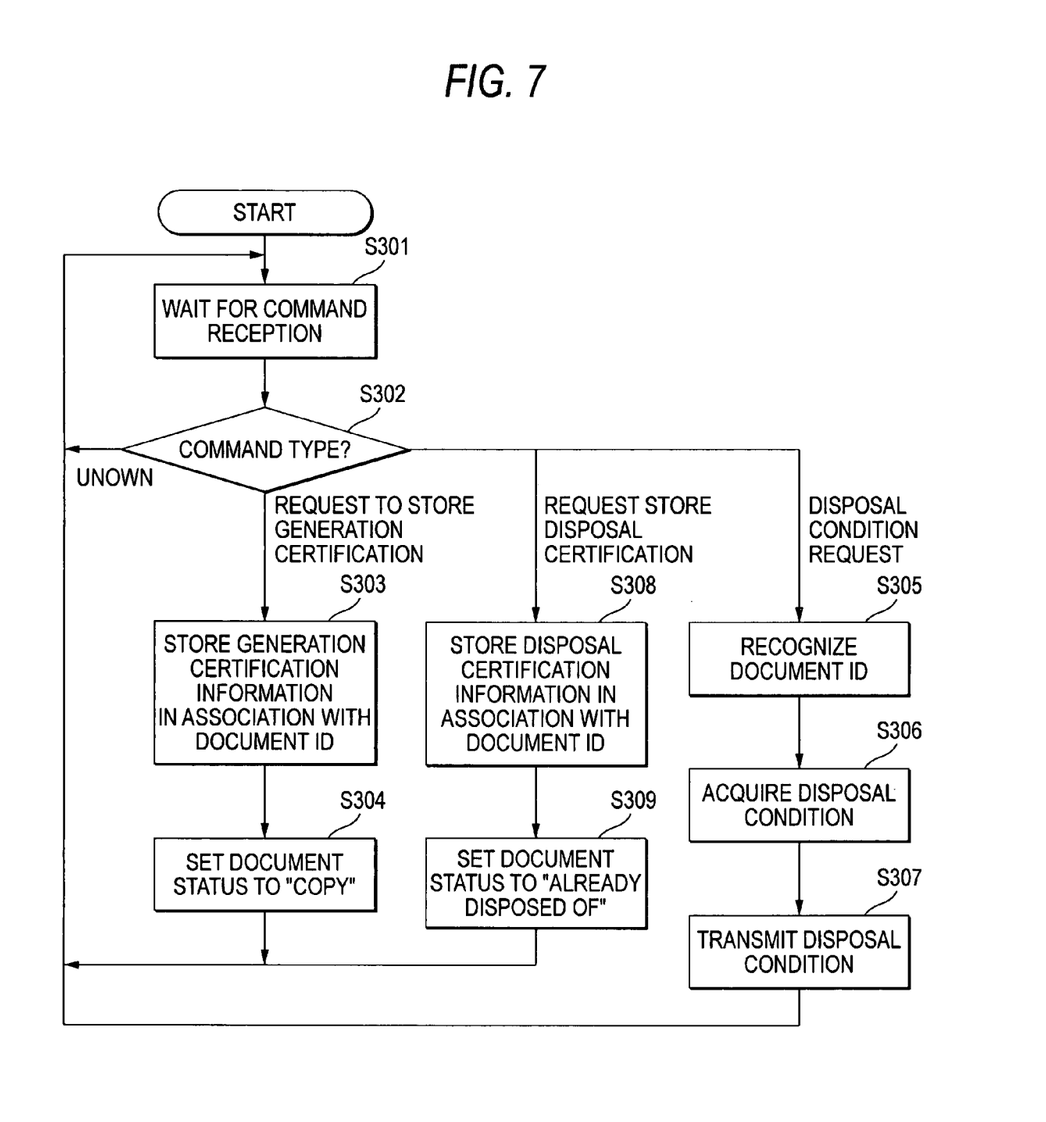
FIG. 7 is a flowchart to show a processing operation example in the document disposal certification apparatus according to the exemplary embodiment of the invention when the document disposal certification apparatus is placed in a server.

FIG. 7 is a flowchart to show a processing operation example in the document disposal certification apparatus 10 according to the exemplary embodiment of the invention when the document disposal certification apparatus 10 is placed in the server 4. As illustrated in the figure, the server 4 always monitors presence or absence of a command transmitted to the server 4 through the communication line 3 (S301). Upon reception of a command, the server 4 first recognizes a type of the command (S302). The type may be recognized based on attribute information contained in the command.

If the received command is transmitted from the document generation apparatus 1 and is a command for requesting the server 4 to store the document presence certification information generated by the document generation apparatus 1 in the table, the server 4 receives the document presence certification information following the command and stores the received document presence certification information (S303). That is, the server 4 stores the received document presence certification information in the generation certification information management table (see FIG. 3B) in association with a document ID relating to the document presence certification information. Further, the server 4 sets a document status corresponding to the document ID to "copy" or "print" in the document status management table (see FIG. 3A) (S304). If information of a document disposal condition is transmitted together with the document presence certification information, the server 4 also stores the information in the disposal condition management table (see FIG. 3D). By performing the processing, the server 4 can determine "when" and "where" "who" generated the document by the document generation apparatus 1, and also determine as to whether the document has already been generated and has not yet been disposed of.

If the received command is transmitted from the document disposal apparatus 2 and is a command for requesting a disposal condition of a target document by the document disposal apparatus 2, that is, a command corresponding to inquiry from the document disposal apparatus 2 as to whether or not it is permitted to dispose of the target document, the server 4 recognizes a document ID determined by the command (document ID of the target document) (S305). The server 4 reads and acquires information of the disposal condition of the document ID from the disposal condition management table (S306). The server 4 returns the acquisition result to the document disposal apparatus 2 as an answer to the inquiry as to whether or not it is permitted to dispose of the target document (S307).

If the received command is transmitted from the document disposal apparatus 2 and is a command for requesting the server 4 to store, in the table, the document disposal certification information generated by the document disposal apparatus 2, the server 4 receives the document disposal certification information following the command and stores the received document disposal certification information (S308). That is, the server 4 stores the received document disposal certification information in the disposal certification information management table (see FIG. 3C) in association with the document ID relating to the document disposal certification information. Further, the server 4 sets a document status corresponding to the document ID to "already disposed of" in the document status management table (see FIG. 3A) (S309). By performing the processing, the server 4 can determine "when" and "where" "who" disposed of the document by the document disposal apparatus 2 and also determine that the document has already been disposed of.

As described above, also in the document disposal certification system of the configuration including the server 4, it is made possible for the server 4 to store and manage the document disposal certification information and the document presence certification information in association with each other for the same document identified by the same document ID. Therefore, strict management of the document life cycle from generation to disposal of the document can be conducted and each of the document presence certification information and the document disposal certification information contains digital certification information and thus the confidentiality and integrity of the certification are also ensured.

That is, in the document disposal certification system described by way of example in the embodiment, in every configuration example, PKI (Public Key Infrastructure) technology of digital certificate (device certificate), communication channel encryption, etc., is applied to certification of document generation and disposal and the confidentiality and integrity of the presence certification and the disposal certification are ensured. Therefore, for example, if a plurality of apparatus exist under management, the apparatus executing document generation and disposal can be identified and moreover whether or not the identification result is tampered of can be checked, so that a high level of security can be retained about information concerning document generation and disposal, etc., and the confidentiality and integrity of the certification about document presence and disposal can be ensured and consequently it is made possible to accomplish strict management of the document life cycle from generation to disposal.

Although the invention has been described in its preferred specific examples as the embodiment, it is to be understood that the invention is not limited to the specific embodiment thereof and that changes may be made as required in the invention without departing from the spirit and scope thereof.

In the embodiment, an apparatus of a copier, a printer, a multifunction processing machine, etc., is used as the document generation apparatus 1 by way of example, but it is also possible to use software for generating a portable document from an already existing electronic document such as a Docuworks® document or a PDF (Portable Document Format) document.

In addition to the components of the document disposal certification system described in the embodiment, an issuing agency for issuing a digital certificate to be retained in each apparatus (CA) may be used as a component in combination.

Further, the function to manage the disposal policy of the disposal condition, etc., (for example, the disposal condition management table) may be managed in an external policy server existing on the communication line 3 (for example, Adobe LiveCycle Policy Server) rather than by the document disposal certification apparatus 10.

Further, to manage the document presence certification information and the document disposal certification information, ASP (Application Service Provider) service for providing a certification information management apparatus in an IDC (data center) may be adopted considering document exchange between enterprises rather than in a network in the same enterprise such as an intranet.

What is claimed is:

1. A document disposal certification system comprising:
    a document generation apparatus that forms an image of a document on a recording medium;
    a document disposal apparatus that disposes of the recording medium; and
    a document disposal certification apparatus, wherein
    the document generation apparatus includes:
        a document ID generation unit that generates document ID information;
        an image forming unit that forms an ID image corresponding to the document ID information on the recording medium; and
        a first certification information generation unit that generates a document presence certification information which associates a user ID information, an apparatus ID information of the document generation apparatus, and time information indicating time when the image is formed on the recording medium with the document ID information and outputs the document presence certification information to the document disposal certification apparatus;
    the document disposal apparatus includes:
        a read unit that reads the ID image formed on the recording medium to be discarded by the document disposal apparatus;
        a disposal unit that discards the recording medium, the ID image of which is read; and
        a second certification information generation unit that generates a document disposal certification information which associates the user ID information, an apparatus ID of the disposal apparatus, and time information indicating time when the recording medium is discarded with the document ID information and outputs the document disposal certification information to the document disposal certification apparatus; and
    the document disposal certification apparatus receives and stores the document presence certification information and the document disposal certification information for the same document in association with each other using the document ID information.

2. A document disposal certification method comprising:
    generating, in a document generation apparatus, document ID information;
    forming, in the document generation apparatus, an ID image corresponding to the document ID information on a recording medium that has an image of a document;
    generating, in the document generation apparatus, document presence certification information which associates a user ID information, an apparatus ID information of the document generation apparatus, and time information indicating time when the image is formed on the recording medium with the document ID information and outputs the document presence certification information to a document disposal certification apparatus;
    reading, in a document disposal apparatus, the ID image formed on the recording medium to be discarded by the document disposal apparatus;
    discarding, in the document disposal apparatus, the recording medium, the ID image of which is read;
    generating, in the document disposal apparatus, document disposal certification information which associates the user ID information, an apparatus ID of the disposal apparatus, and time information indicating time when the recording medium is discarded with the document ID information and outputs the document disposal certification information to the document disposal certification apparatus; and
    receiving and storing, in the document disposal certification apparatus, the document presence certification information and the document disposal certification information for the same document in association with each other using the document ID information.

3. A non-transitory computer readable medium storing a program causing a computer to perform a document disposal certification process, the process comprising:

generating, in a document generation apparatus, document ID information;

forming, in the document generation apparatus, an ID image corresponding to the document ID information on a recording medium that has an image of a document;

generating, in the document generation apparatus, document presence certification information which associates a user ID information, an apparatus ID information of the document generation apparatus, and time information indicating time when the image is formed on the recording medium with the document ID information and outputs the document presence certification information to a document disposal certification apparatus;

reading, in a document disposal apparatus, the ID image formed on the recording medium to be discarded by the document disposal apparatus;

discarding, in the document disposal apparatus, the recording medium, the ID image of which is read;

generating, in the document disposal apparatus, document disposal certification information which associates the user ID information, an apparatus ID of the disposal apparatus, and time information indicating time when the recording medium is discarded with the document ID information and outputs the document disposal certification information to the document disposal certification apparatus; and receiving and storing, in the document disposal certification apparatus, the document presence certification information and the document disposal certification information for the same document in association with each other using the document ID information.

4. A document disposal certification system comprising:
a document generation apparatus that forms an image of a document on a recording medium;
a document disposal apparatus that disposes of the recording medium; and
a document disposal certification apparatus, wherein
the document generation apparatus includes:
  a document ID generation unit that generates document ID information;
  an image forming unit that forms an ID image corresponding to the document ID information on the recording medium; and
  a first certification information generation unit that generates document presence certification information which associates a user ID information, an apparatus ID information of the document generation apparatus, and time information indicating time when the image is formed on the recording medium with the document ID information and outputs the document presence certification information to the document disposal certification apparatus;
the document disposal apparatus includes:
  a read unit that reads the ID image formed on the recording medium to be discarded by the document disposal apparatus;
  a disposal unit that discards the recording medium, the ID image of which is read; and
  a second certification information generation unit that generates document disposal certification information which associates the user ID information, an apparatus ID of the disposal apparatus, and time information indicating time when the recording medium is discarded with the document ID information and outputs the document disposal certification information to the document disposal certification apparatus;
the document disposal certification apparatus receives and stores the document presence certification information and the document disposal certification information for the same document in association with each other using the document ID information; and
the document presence certification information and the document disposal certification information includes digital certification information of a user ID certified by the user's digital certificate, a machine ID certified by a digital certificate of the document generation apparatus and time stamp information certified by a time stamp server.

5. A document disposal certification system comprising:
a document generation apparatus that forms an image of a document on a recording medium;
a document disposal apparatus that disposes of the recording medium; and
a document disposal certification apparatus, wherein
the document generation apparatus includes:
  a document ID generation unit that generates document ID information;
  an image forming unit that forms an ID image corresponding to the document ID information on the recording medium; and
  a first certification information generation unit that generates document presence certification information which associates a user ID information, an apparatus ID information of the document generation apparatus, and time information indicating time when the image is formed on the recording medium with the document ID information and outputs the document presence certification information to the document disposal certification apparatus;
the document disposal apparatus includes:
  a read unit that reads the ID image formed on the recording medium to be discarded by the document disposal apparatus;
  a disposal unit that discards the recording medium, the ID image of which is read; and
  a second certification information generation unit that generates document disposal certification information which associates the user ID information, an apparatus ID of the disposal apparatus, and time information indicating time when the recording medium is discarded with the document ID information and outputs the document disposal certification information to the document disposal certification apparatus;
the document disposal certification apparatus receives and stores the document presence certification information and the seeend document disposal certification information for the same document in association with each other using the document ID information; and
when the read unit reads the ID image, the document disposal apparatus determines whether or not the recording medium can be disposed of by inquiring of the document disposal certification apparatus whether or not the recording medium can be disposed, and if the document disposal certification apparatus indicates that it is not permitted to dispose of the recording medium, the recording medium is not disposed of, and if no answer is received due to a communication error, the recording medium is not disposed of.

* * * * *